United States Patent
Schneider

(10) Patent No.: US 10,995,218 B2
(45) Date of Patent: May 4, 2021

(54) METHOD FOR PRODUCING MODIFIED PRECIPITATED SILICA AND A COMPOSITION CONTAINING THE SAME

(71) Applicant: Wacker Chemie AG, Munich (DE)

(72) Inventor: Achim Schneider, Neu-Isenburg (DE)

(73) Assignee: WACKER CHEMIE AG, Munich (DE)

( * ) Notice: Subject to any disclaimer, the term of this patent is extended or adjusted under 35 U.S.C. 154(b) by 317 days.

(21) Appl. No.: 16/089,315

(22) PCT Filed: Jul. 27, 2016

(86) PCT No.: PCT/EP2016/067949
§ 371 (c)(1),
(2) Date: Sep. 27, 2018

(87) PCT Pub. No.: WO2018/019373
PCT Pub. Date: Feb. 1, 2018

(65) Prior Publication Data
US 2020/0308412 A1    Oct. 1, 2020

(51) Int. Cl.
*C09C 1/30* (2006.01)
*C07F 7/08* (2006.01)

(52) U.S. Cl.
CPC .......... *C09C 1/3081* (2013.01); *C07F 7/0801* (2013.01)

(58) Field of Classification Search
CPC ............................ C09C 1/3081; C07F 7/0801
See application file for complete search history.

(56) References Cited

U.S. PATENT DOCUMENTS

| | | | | |
|---|---|---|---|---|
| 2,441,422 A * | 5/1948 | Elliott | ................. | C04B 41/4927 106/634 |
| 2,657,149 A * | 10/1953 | Iler | ........................ | C07F 7/025 106/490 |
| 2,786,042 A | 3/1957 | Iler | | |
| 2,801,186 A * | 7/1957 | Alexander | ............ | C09C 1/3081 106/409 |
| 2,940,830 A * | 6/1960 | Thornhill | ................. | C08L 21/00 423/339 |
| 2,945,817 A * | 7/1960 | Goldblum | ............ | B01J 13/0091 106/490 |
| 4,015,031 A * | 3/1977 | Reinhardt | ................. | C09C 1/28 427/213 |
| 4,273,589 A | 6/1981 | Degussa | | |
| 4,681,750 A * | 7/1987 | Johnson | ............... | H01M 2/1653 423/339 |
| 6,184,408 B1 | 2/2001 | Burns et al. | | |
| 2003/0082090 A1 | 5/2003 | Blume et al. | | |
| 2003/0162881 A1 | 8/2003 | Panz et al. | | |
| 2003/0181565 A1 | 9/2003 | Panz et al. | | |
| 2003/0195290 A1 | 10/2003 | Scholz et al. | | |
| 2005/0192395 A1 * | 9/2005 | Panz | ..................... | C09C 1/3081 524/493 |
| 2006/0100344 A1 * | 5/2006 | Stenzel | ................. | B60C 1/0016 524/493 |
| 2007/0100057 A1 * | 5/2007 | Stenzel | ................. | B60C 1/0016 524/492 |
| 2011/0283916 A1 * | 11/2011 | Bohlander | .............. | C04B 12/04 106/14.11 |
| 2015/0307870 A1 * | 10/2015 | Fabis | ................. | C04B 35/62849 536/25.4 |
| 2016/0096949 A1 * | 4/2016 | Evans | ..................... | C08K 3/34 521/122 |
| 2016/0326374 A1 * | 11/2016 | Blume | .................. | C09C 1/3081 |
| 2018/0141820 A1 * | 5/2018 | Zhang | ................... | C09C 1/3018 |
| 2019/0375942 A1 * | 12/2019 | Hindelang | .............. | C09C 1/309 |

FOREIGN PATENT DOCUMENTS

| | | | | |
|---|---|---|---|---|
| DE | 1229504 B | 12/1966 | | |
| DE | 2513608 A1 | 10/1976 | | |
| DE | 3309272 A1 | 9/1984 | | |
| DE | 10151777 A1 | 8/2003 | | |
| EP | 0125418 A1 | 11/1984 | | |
| EP | 1048696 A2 | 11/2000 | | |
| EP | 1281733 A1 | 2/2003 | | |
| EP | 1295850 A1 | 3/2003 | | |
| EP | 1295906 A1 | 3/2003 | | |
| EP | 1333053 A2 | 8/2003 | | |
| EP | 1 559 744 A1 | 8/2005 | | |
| EP | 1559744 A1 * | 8/2005 | ............... | C08K 9/06 |
| EP | 1561728 A1 | 8/2005 | | |
| GB | 607427 A * | 8/1948 | .......... | B01J 13/0091 |
| GB | 1062599 | 3/1967 | | |
| GB | 2001303 A1 | 1/1979 | | |
| JP | 56022621 A2 | 3/1981 | | |
| JP | 2007519793 A | 7/2007 | | |
| JP | 2015129082 A | 7/2015 | | |
| WO | WO-9837013 A1 * | 8/1998 | .......... | C09C 1/3081 |
| WO | 05075551 A1 | 8/2005 | | |
| WO | 11106289 A2 | 9/2011 | | |
| WO | 2011106289 A2 | 9/2011 | | |
| WO | 16054524 A2 | 4/2016 | | |
| WO | WO-2019129607 A1 * | 7/2019 | .......... | C01B 33/193 |

* cited by examiner

Primary Examiner — Alexander R Pagano
(74) Attorney, Agent, or Firm — Brooks Kushman P.C.

(57) ABSTRACT

Modified precipitated silica is produced in a one pot synthesis by forming precipitated silica and modifying with an organosiliconate. The modified precipitated silica is washed following preparation, affording a modified precipitated silica with low levels of ionic substances.

9 Claims, No Drawings ically modified silicas available on the market typi-

METHOD FOR PRODUCING MODIFIED PRECIPITATED SILICA AND A COMPOSITION CONTAINING THE SAME

CROSS REFERENCE TO RELATED APPLICATIONS

This application is the U.S. National Phase of PCT Appln. No. PCT/EP2016/067949 filed Jul. 27, 2016, the disclosure of which is incorporated in its entirety by reference herein.

BACKGROUND OF THE INVENTION

1. Field of the Invention

The invention provides a process for producing a modified precipitated silica, wherein i) the modification is effected in a reaction mixture comprising 1) acid and 2) a compound selected from a precipitated silica and/or [SiO$_{4/2}$] starting materials and 3) a organosiliconate as modifying agent, wherein the modification reaction is effected during or directly after the reaction for production of the precipitated silica; ii) the reaction mixture is then filtered and washed; and iii), the reaction mixture is optionally dried, wherein the [SiO$_{4/2}$] starting materials used are alkoxysilanes or alkali metal silicates.

2. Description of the Related Art

Precipitated silicas are oxides of silicon (SiO$_2$) that are produced on the industrial scale by precipitation processes and are used in a broad field of application. Owing to their structural characteristics and the associated strengthening effect, they constitute an elemental constituent both of organic rubbers, for example for use in tires, and in silicone rubbers or other polymeric materials. According to the crosslinking temperature necessary, a distinction is made between silicone rubbers that crosslink under cold conditions or at room temperature (RTV) and those that crosslink under hot conditions or at high temperature (HTV).

In addition, however, they also find use, for example, as a free-flow additive, reinforcing filler, carrier, filter auxiliary, for rheology control, or for their abrasive properties. Free-flow additives or antiblocking agents (anticaking agents) as additives in powdery or granular materials prevent lump formation and thus enable simple packing, transport and use.

According to the desired effect in the target application, the production has to achieve particular profiles of properties. For instance, numerous patent applications suggest that it is possible through exact control of particular process parameters, for example temperature, pH, and metering rates, to produce silicas having a particular combination of product properties which in turn have an advantageous effect in the target applications.

In particular cases, surface modification of the silica beyond the control of the structural properties is also necessary, for example in order to improve the interactions with the surrounding matrix and/or the quality of dispersion, or in order to reduce water absorption. Modification is typically accomplished using substances having organic, i.e. carbon-containing, groups. A simple way of detecting and quantifying the presence of a modification is elemental analysis for the carbon content.

As early as in DE1229504, for example, the possibility of obtaining hydrophobic silicas by addition of organochlorosilanes to waterglass is described. But this method did not subsequently become established and was barely mentioned in later patent applications.

The technological approach of the addition of organochlorosilanes in the production of the precipitated silicas from waterglass has crucial disadvantages compared to subsequent modification, since there are barely any ways of controlling the structural parameters of the precipitated silica.

Instead, more recent documents have virtually exclusively described multistage processes for production of modified silicas. For instance, patent application DE2513608 describes the subsequent modification of a precipitated silica with alkoxysilanes at 300° C. The downstream process for modification is costly since it includes complex plants for handling of the powder and a further thermal heating step.

If possible and technically viable, the modification is therefore often only effected in situ during use in the target application. For example, EP1295850 describes the production of specific silicas for tire rubber and in situ modification with a sulfur-containing organosilane. But this is not always possible or desirable.

For a multitude of applications, high chemical purity is important. For example, poor insulation properties of silicone compounds can frequently be attributed to ionic impurities that are introduced with the filler. Other impurities can adversely affect the visual appearance of silicone rubbers in the form of discoloration. And in the case of applications in electrophotographic toners too, high levels of impurities can severely affect charging characteristics.

In the above-cited embodiments for production of surface-modified silicas, however, it is not possible to subsequently remove nonvolatile water-soluble impurities, for example salts, because the products are highly hydrophobic, i.e. are not wetted by water. For this reason, organically modified precipitated silicas available on the market typically have high levels of salt impurities, and therefore fumed silicas that are usually highly pure but distinctly more expensive are used in sensitive applications.

SUMMARY OF THE INVENTION

It is an object of the invention to provide an economic and additionally resource-conserving process for the rapid and simple production of inexpensive, organically modified silicas, and compositions having a high chemical purity comprising these silicas. These and other objects are achieved by a process for producing a modified precipitated silica, wherein i) the modification is effected in the reaction mixture comprising 1) acid, 2) a compound selected from a precipitated silica and/or [SiO$_{4/2}$] starting materials, and 3) an organosiliconate as a modifying agent, wherein the modification reaction is effected during or directly after the reaction for production of the precipitated silica, ii) the reaction mixture is then filtered and washed and iii) the reaction mixture is optionally dried, wherein the [SiO$_{4/2}$] starting materials used are alkoxysilanes or alkali metal silicates.

DETAILED DESCRIPTION OF THE PREFERRED EMBODIMENTS

Silicas refer to the oxygen acids of silicon having the general empirical formula H$_{2n+2}$Si$_n$O$_{3n+1}$. The empirical formula is frequently stated as SiO$_2$.x H$_2$O where x may be any value between 0 and 2; however, the water in the case of silicas is not water of crystallization but can only be eliminated by a chemical reaction and forms from bound hydroxyl groups. Synthetic $SiO_2$ is produced on the industrial scale mainly via precipitation processes. $SiO_2$ produced in this way is called precipitated silica.

A great advantage of precipitated silicas is that these are an inexpensive product, by contrast with the distinctly more expensive fumed silicas.

Modification of precipitated silica achieves a better profile of properties, and so the modification of the silicas is a prerequisite in many applications that require, for example, lower water absorption or higher breaking strength.

Precipitated silicas are produced by processes known to those skilled in the art, as described, for example, in U.S. Pat. Nos. 2,657,149, 2,940,830 and 4,681,750, from condensable tetrafunctional or higher-functionality silanes, alkoxysilanes, alkyl silicates or alkali metal silicates (waterglasses) or colloidal silica particles or solutions. The reaction mixture of the invention comprises 1) acid, 2) the precipitated silica and/or $[SiO_{4/2}]$ starting materials, and 3) an organosiliconate as a modifying agent, where the $[SiO_{4/2}]$ starting materials used are alkoxysilanes or alkali metal silicates. In a preferred embodiment, alkoxysilanes are used as $[SiO_{4/2}]$ starting materials. In an alternatively preferred embodiment, alkali metal silicates are used as $[SiO_{4/2}]$ starting materials. $[SiO_{4/2}]$ units denote compounds in which one silicon atom is bonded to four oxygen atoms, each of which in turn has a free electron for a further bond. It is possible for units having Si—O—Si bonds that are bonded via the oxygen atom to be present. In the simplest case, the free oxygen atoms are bonded to hydrogen or carbon, or the compounds are in the form of salts, preferably alkali metal salts.

According to the invention, starting materials (precursors) used for formation of $[SiO_{4/2}]$ units ($[SiO_{4/2}]$ starting material) are alkoxysilanes or alkali metal silicates (waterglasses). In the context of this invention, the $[SiO_{4/2}]$ units denote the precipitated silica; alkoxysilanes or alkali metal silicates serve as $[SiO_{4/2}]$ starting materials for production thereof.

In both cases, i.e. no matter whether alkoxysilanes or alkali metal silicates serve as $[SiO_{4/2}]$ starting materials, a first reaction step at first forms silicas that are of low molecular weight and soluble. For the sake of simplicity, in the reaction equations which follow, only monomeric structures are described, although soluble oligomeric structures may also be involved.

If alkoxysilanes are used as starting material for production of precipitated silicas, hydrolysis in water can be catalyzed by acids or bases:

$$Si(OR)_4 + 4H_2O \rightarrow Si(OH)_4 + 4ROH$$

Preferably, the hydrolysis is conducted in aqueous solutions of mineral or organic acids, more preferably in aqueous sulfuric acid solution, hydrochloric acid solution or carbonic acid.

Alkoxysilanes used are preferably tetramethoxysilane and more preferably tetraethyl orthosilicate (TEOS).

Particular preference is given to using waterglasses as $[SiO_{4/2}]$ starting materials. Waterglass refers to vitreous, i.e. amorphous, water-soluble sodium silicates, potassium silicates and lithium silicates that have solidified from a melt, or aqueous solutions thereof.

By reaction with acid, preferably in aqueous sulfuric acid solution, hydrochloric acid solution or carbonic acid, soluble silicas of low molecular weight are formed here too:

$$M_2O \cdot zSiO_2 + HX \rightarrow zSi(OH)_4 + 2MX$$

where z is any positive number.

The structures that are present in aqueous solution are much more complicated in reality than is shown here. Nevertheless, the familiar notation for waterglasses has been used. The exact stoichiometry and composition of the salt formed (MX) does of course depend on the quality of the waterglass used and can be represented here only schematically.

It is also possible to use mixtures or hydrolysis products of the starting materials mentioned, especially the hydrolysis products thereof with water and/or alcohols.

The orthosilicic acid $Si(OH)_4$ or oligomeric compounds formed in this way react under suitable reaction conditions with condensation and form particulate solids essentially formed from $SiO_{4/2}$ units:

$$zSi(OH)_4 \rightarrow SiO_{4z/2} + 2nH_2O$$

where z is any positive number.

Condensation is promoted in an acidic medium or particularly in an alkaline medium.

Acids used may be mineral acids, organic acids and/or carbon dioxide.

It is possible to add further substances to the reaction mixture, for example electrolytes and/or alcohols. The electrolyte may be a soluble inorganic or organic salt. The preferred alcohols include methanol, ethanol or i-propanol. In a preferred embodiment, further substances added to the reaction mixture, in addition to water, alkali metal silicate, acid and organosiliconate, are solely electrolytes and/or alcohols, more preferably solely electrolytes, and most preferably no further substances are added to the reaction mixture.

Preferably, the reaction mixture comprises water, alkali metal silicate, acid and organosiliconate, more preferably water, alkali metal silicate, acid and methylsiliconate, and most preferably water, sodium silicate (sodium waterglass), sulfuric acid and sodium monomethylsiliconate. This composition has the advantage that, aside from the product, the sodium sulfate salt is the only by-product obtained. This salt of good water solubility can be separated relatively easily from the product, for which it is possible to use separation methods such as filtration, sedimentation and/or centrifugation.

Preferably, the temperature of the reaction mixture is between 50° C. and 105° C., more preferably between 75° C. and 95° C. and most preferably between 85° C. and 95° C. In a particularly preferred embodiment, the reaction temperature is kept constant for the rest of the process.

Preferably, the pH of the reaction mixture is between pH=8 to pH=10, more preferably between pH=8.5 to pH=9.5 and most preferably at a pH of 9. In a particularly preferred embodiment, the pH is kept constant for the rest of the process. For this purpose, preference is given to adding further acid, more preferably sulfuric acid or hydrochloric acid and most preferably concentrated sulfuric acid, to the reaction mixture in order to counteract the alkalinity of any waterglass added.

The reactants such as acid, $[SiO_{4/2}]$ starting materials, modifying agents and any further substances are preferably added at a constant metering rate. "Constant metering rate" means that it changes over the course of the metering time preferably by a maximum of 15%, more preferably by a maximum of 5% and most preferably by a maximum of 1%, based on the average rate calculated as the quotient of the total metering volume and time.

The metered addition is preferably effected over a period of 30 min to 120 min, more preferably over a period of 45 min to 90 min and most preferably over a period of 60 min to 70 min.

The total amount of the $[SiO_{4/2}]$ starting materials metered in is preferably chosen such that the solids content, calculated as the mass of $[SiO_{4/2}]$ units, does not exceed 20% by weight, more preferably 10% by weight, of the total mass of the reactants. Most preferably, the solids content, calculated as the mass of $[SiO_{4/2}]$ units, is between 4% by weight and 8% by weight, based on the total mass of the reaction mixture. The mass of the reactants is determined gravimetrically.

The exact microstructure of the silica is formed is highly dependent on the exact reaction conditions. This is most clearly shown by the change in the BET surface area, which is essentially inversely proportional to the size of the particles of the precipitated silica produced.

In general, the reaction components are mixed by simple stirring. Readily dispersible silica fillers having particularly uniform particle size, specific surface area and "structure" can also be produced by reacting alkali metal silicate solutions with acids and/or acidic substances, optionally in the presence of neutral salts, in that the precipitation of the silica is undertaken by rapid and intensive mixing of the reaction components under the action of high shear forces that result from a steep velocity gradient.

The high velocity gradient is preferably generated by means of continuous dispersers, for example a colloid mill.

In the 1st process step (i) for production of a modified precipitated silica, the reaction for production of precipitated silica and the modification thereof are effected in the same batch, where the modification reaction is effected during or directly after the reaction for preparation of the precipitated silica. This means that the modification is effected in the above-described reaction mixture that serves for production of the precipitated silica. In the context of this invention, this process is also referred to as a one-pot process. The one-pot process is a distinct difference from the prior art, which generally works with multistage, separate operations.

According to the invention, the modification reaction is effected during or directly after the reaction for preparation of the precipitated silica. According to the invention, "directly" in this connection means that the modification is effected in the reaction mixture comprising 1) acid, 2) the precipitated silica and/or $[SiO_{4/2}]$ starting materials, and 3) an organosiliconate as modifying agent, without conducting any process steps for removal of salts and/or other by-products prior to the modification reaction. The basis of the term "directly" is not directly after; stirring or leaving to stand between the reaction steps is not ruled out. According to the invention, however, no ion exchange, filtration, washing, distillation or centrifugation step and no resuspension is conducted before the modification reaction. Dispensing with a prior process step for removal of salts and/or other by-products has the great advantage of saving energy costs, time and resources, for example wash solution or wash water and solution or water for resuspension. This method makes utilization of further equipment superfluous. In economic terms, it is of particular interest that the process of the invention saves time and hence lowers the plant occupation time. The other by-products include alcohols.

In the modification or modification reaction, which is also referred to synonymously in the context of this invention as a hydrophobization or hydrophobization reaction, the unmodified precipitated silica reacts with a modifying agent. Correspondingly, the modifying agent is also referred to synonymously in the context of this invention as cover agent, covering agent, hydrophobizing agent or silylating agent.

The degree of modification can be determined via the carbon content according to DIN ISO 10694. This is preferably 0.1% by weight to 15% by weight. According to the desired use of the modified precipitated silica, particular degrees of modification may be particularly preferred. For example, the carbon content in the case of uses in silicone rubbers is more preferably 0.5% by weight to 4% by weight and most preferably 1% by weight to 2% by weight. In the case of uses as an antiblocking agent, it is more preferably 4% by weight to 10% by weight and most preferably 5% by weight to 7% by weight.

Preferably, the temperature of the reaction mixture in the modification is additionally between 50° C. and 105° C., more preferably between 75° C. and 95° C. and most preferably between 85° C. and 95° C. More preferably, the reaction temperature is kept constant during process step i, meaning that it varies by not more than ±5° C., more preferably by not more than ±2° C.

Preferably, the pH of the reaction mixture is additionally between pH=8 to pH=10, more preferably between pH=8.5 to pH=9.5 and most preferably pH=9. More preferably, the pH is kept constant during process step i, meaning that it varies by not more than 0.5 unit, more preferably by not more than 0.2 unit. For this purpose, preference is given to adding further acid to the reaction mixture, for example sulfuric acid or hydrochloric acid and most preferably concentrated sulfuric acid, in order to counteract the alkalinity of any siliconate added.

Preferably, this process step takes place while stirring. Preferably, this process step takes place under the action of high shear forces that result from a steep velocity gradient. The high velocity gradient is preferably generated by means of continuous dispersers, for example a colloid mill.

This has the advantage that finely divided silica having good dispersion properties is obtained.

Preferably, when the reaction mixture is made up, the modifying agent is added to the reaction mixture in parallel with the $[SiO_{4/2}]$ starting materials and the acid. In this case, it is most preferable that the endpoint of the metered addition of the modifying agent coincides with the endpoint of the metered addition of the $[SiO_{4/2}]$ starting materials. In another preferred embodiment, the endpoint of the metered addition of the modifying agent goes beyond the endpoint of the metered addition of the $[SiO_{4/2}]$ starting materials.

In the case of parallel metered addition of modifying agent and the $[SiO_{4/2}]$ starting materials, irrespective of whether the metered addition of the modifying agent ends simultaneously with the metered addition of the $[SiO_{4/2}]$ starting materials or goes beyond that, it is possible to wholly or partly dispense with a further separate, additional, later addition of the same or another modifying agent to the reaction mixture. It is particularly preferable to completely dispense with any further separate addition of the same or another modifying agent to the reaction mixture. If the modifying agent is metered into the reaction mixture directly when making up the reaction mixture with the $[SiO_{4/2}]$ starting materials and the acid, the process of the invention is particularly inexpensive, rapid and simple.

In a particularly preferred embodiment, during the period of overlap, i.e. the common metered addition of $[SiO_{4/2}]$ starting materials and modifying agents, the metered addition of the $[SiO_{4/2}]$ starting materials is gradually reduced, whereas that of the modifying agent is gradually increased. This method has the advantage that the controlled addition of the modifying agent allows control of the modification reaction. Following a theoretical concept of the particle structure, the degree of modification in the core of the particles is relatively low and then rises. The use of the modifying agent, which is more costly compared to the [SiO$_{4/2}$] starting materials, is particularly efficient in this case.

In another preferred embodiment, the modifying agent is added to the reaction mixture at a different time. This means that acid and [SiO$_{4/2}$] starting materials are metered in a controlled manner at defined temperature and defined pH (see above for preferred conditions), and the modifying agent is only then metered in sequentially, i.e. at a different time. This means that only on complete conclusion of metered addition of the acid and [SiO$_{4/2}$] starting materials is the modifying agent added to the reaction mixture. The reaction for production of the precipitated silica and the modification thereof do take place in the same batch (one-pot process), but this is a two-stage operation.

In this case of addition of the modifying agent at a different time, the metered addition is preferably effected over a period of 5-120 min, more preferably 5-90 min and most preferably 10-30 min.

In this case of addition of the modifying agent at a different time, the modifying agent can be added to the reaction mixture in one step or in multiple small portions, in which case it can be added at a constant metering rate in each case or at a metering rate that is increased gradually.

The term "at a different time" relates to the reaction. The modification reaction starts at a different time. In the case of a continuous reaction regime, "at a different place" relates to the plant configuration (see below). In other words, in order to achieve addition at a different time, the feeding has to be effected at a different place.

This method has the advantage that the addition of the modifying agent and hence the modification reaction proceeds in a controlled manner.

As already described for the parallel metered addition, it is conceivable that this method can form the core of the particles produced from the cheaper alkali metal silicates, while the outer portion of the particles (shell) is possibly additionally modified, i.e. has a chemically bound group transferred by the modifying agent. In this way, it is possible to produce primary particles formed in the form of a core-shell model. In economic terms, the advantage of this process is then that it is predominantly the particle surface, which has a significant effect on the later use, that reacts with the relatively costly modifying agent.

In addition to the described metered addition of modifying agent and [SiO$_{4/2}$] starting materials in a parallel manner or at a different time, all mixed forms are conceivable, meaning that, for example, one portion of the modifying agent is metered in in parallel and with a gradually rising metering rate, for example, and one portion at a different time and with a constant metering rate, for example. For production of the modified precipitated silica, the metered addition of modifying agent and [SiO$_{4/2}$] starting materials can thus be chosen as desired and hence the particle properties can be controlled.

In accordance with the theoretical concept of the particle structure (see above), it is possible to produce not only particles structured according to the core-shell model with a rising degree of modification that rises suddenly or abruptly from the inside outward, but also, by continuous addition of the modifying agent, particles structured according to the gradient model with a degree of modification rising gradually from the inside outward.

The modifying agents can be added to the reaction mixture in liquid form or as a dry powder.

The modifying agents may be mixed in in pure form or as solutions in water or in known solvents used in industry, for example alcohols, for example methanol, ethanol or i-propanol, ethers, for example diethyl ether, tetrahydrofuran or dioxane, or hydrocarbons, for example hexanes or toluene.

A modifying agent is understood in the present application to mean organosiliconates and solutions thereof.

According to the invention, organosiliconates refer to compounds of the general formula (I)

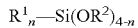

$R^1{}_n\text{—Si}(OR^2)_{4-n}$ where $R^1$, $R^2$ and n have the following definitions:
$R^1$=independently hydrogen, linear or branched, optionally functionalized $C_1$-$C_{30}$-alkyl, linear or branched, optionally functionalized $C_2$-$C_{30}$-alkenyl, linear or branched, optionally functionalized $C_2$-$C_{30}$-alkynyl, optionally functionalized $C_3$-$C_{20}$-cycloalkyl, optionally functionalized $C_3$-$C_{20}$-cycloalkenyl, optionally functionalized $C_1$-$C_{20}$-heteroalkyl, optionally functionalized $C_5$-$C_{22}$-aryl, optionally functionalized $C_6$-$C_{23}$-alkylaryl, optionally functionalized $C_6$-$C_{23}$-arylalkyl, optionally functionalized $C_5$-$C_{22}$-heteroaryl,
$R^2$=independently hydrogen, linear or branched, optionally functionalized $C_1$-$C_{30}$-alkyl, linear or branched, optionally functionalized $C_2$-$C_{30}$-alkenyl, linear or branched, optionally functionalized $C_2$-$C_{30}$-alkynyl, optionally functionalized $C_3$-$C_{20}$-cycloalkyl, optionally functionalized $C_3$-$C_{20}$-cycloalkenyl, optionally functionalized $C_1$-$C_{20}$-heteroalkyl, optionally functionalized $C_5$-$C_{22}$-aryl, optionally functionalized $C_6$-$C_{23}$-alkylaryl, optionally functionalized $C_6$-$C_{23}$-arylalkyl, optionally functionalized $C_5$-$C_{22}$-heteroaryl,
$NR^1{}_4{}^+$ where $R^1$ may independently have the definitions given above,
group of the general formula $1/(p-n*y)\, M^{p+}X^{n-}{}_y$, where M is a metal atom selected from the group consisting of metals of the main and transition groups of the Periodic Table of the Elements, X is an anion, p is the oxidation number of the metal atom M, n is an integer of 1, 2 or 3 and y is an integer of 0, 1 or 2,
and/or
group of the general formula (IIa)

$\text{—SiR}^1{}_m(OR^2)_{3-m}$ where $R^1$ and $R^2$ independently have the definitions given above and m may independently be 0, 1, 2 or 3,
n=1, 2 or 3,
and at least one solvent, at least one surface-active substance or a mixture thereof,
where, in the compound of the general formula (I) or in the group of the general formula (IIa), is at least one $R^2NR^1{}_4{}^+$ radical or a group of the general formula $1/(p-n*y)\, M^{p+}X^{n-}{}_y$ with the abovementioned definitions of $R^1$, p, n, y, M and X.

If $R^2$ in the compound of general formula (I) has the definition of a group of the general formula (IIa) at multiple instances, for example more than once, the compounds are corresponding compounds that bear two, three, four or more units having silicon atoms. Therefore, if $R^2$ is a group of the general formula (IIa) at multiple instances, the compounds are polysiloxanes.

It is the case that an organosiliconate has at least one Si—C bond, meaning that at least one radical has to be organic in nature.

The particular advantage when organosiliconates are used as modifying agents is that these are highly water-soluble and therefore particularly suitable for a homogeneous reaction in an aqueous medium. The use of an aqueous solution of the otherwise solid substances simplifies handling, since exact metered addition can be achieved in a comparatively simple manner by means of pumps.

Modifying agents that are typically used, by contrast, have sparing to zero water solubility. They react vigorously with water, spontaneously in some cases and with significant evolution of heat, which makes it much more difficult to conduct the reaction in a safe, uniform and controlled manner (this relates, for example, to the chlorosilanes that are often used).

According to the invention, it is also possible to use mixtures of various organosiliconates. Mixtures are used with preference when functional groups (e.g. vinyl, allyl, or sulfur-containing groups, for example $C_3H_6SH$) are to be introduced.

The organosiliconate used in the process of the invention is preferably a methylsiliconate, most preferably a monomethylsiliconate.

Beyond the statements made above, the use of monomethylsiliconates is particularly advantageous because monomethylsiliconates can be obtained in a simple manner and in good yield from the readily available and inexpensive substances methyltrichlorosilane, methyltrimethoxysilane or methylsilanetriol by reaction with alkaline substances, optionally in an aqueous medium.

Particular preference is given to using aqueous solutions of monomethylsiliconates of the general form $(CH_3)Si(OH)_{3-x}OM_x$ and oligomeric condensation products thereof, where the counterion M is preferably potassium or sodium and, preferably, x=0.5-1.5, more preferably 0.8-1.3. In a particularly preferred embodiment, x=0.8-0.9. x here does not relate to 1 molecule, but to the totality of the molecules present in the mixture.

The organosiliconate solution used preferably has a density of 1.2-1.4 g/cm$^3$. The density can be determined according to DIN 12791, for example.

The impurities in the organosiliconate solution resulting from alcohols present as a result of the preparation (e.g. ethanol or methanol) are preferably <1% by weight, more preferably <100 ppm.

The alcoholic impurities can be determined by quantitative gas chromatography (for example with the Agilent 6890 gas chromatograph with an FID detector and OV-1 separation column) The solids content of the aqueous organosiliconate solutions is preferably 20% by weight to 70% by weight, more preferably 30% by weight to 60% by weight.

The solids content can be determined with an IR moisture analyzer (for example with the Sartorius MA 30 IR moisture analyzer at a measurement temperature of 105° C.).

The active ingredient content calculated as $(CH_3)SiO_{3/2}$ in the reaction mixture is preferably 15% by weight to 40% by weight, more preferably 30% by weight to 35% by weight.

The alkali metal content of the organosiliconate solution is preferably 5% by weight to 20% by weight, more preferably 9% by weight to 18% by weight. The alkali metal content can be determined, for example, by titration with 0.1 molar hydrochloric acid against the indicator phenolphthalein. The number of groups that give a basic reaction in the case of organosiliconate solutions corresponds to the number of alkali metal ions.

The silicas of the invention can be modified with exclusively one organosiliconate, but it is also possible to use a mixture of two or more compounds from the group of the organosiliconates.

The total amount of the modifying agent metered in is preferably chosen such that the solids content, calculated as $[SiO_{4/2}]_g[(CH_3)SiO_{3/2}]_j$ (with g and j independently as any positive number), i.e. the solids content of the modified $[SiO_{4/2}]$ units in the modified precipitated silica produced, does not exceed 25% by weight, more preferably 15% by weight, of the total mass of the reaction mixture. Most preferably, the solids content, calculated as $[SiO_{4/2}]_m[(CH_3)SiO_{3/2}]_n$, is between 5% by weight and 10% by weight, based on the total mass of the reaction mixture.

According to the invention, it is preferable that the concentration of modified groups in the primary particles increases from the inside outward.

On conclusion of incubation time, i.e. after process step i and before process step ii, it is preferable that the pH is lowered to a value lower than pH=5, more preferably to a value lower than pH=4 and most preferably to pH=3.5.

In addition, the reaction mixture, on conclusion of incubation time, i.e. after process step i and before process step ii, is preferably cooled to a temperature of less than 55° C. and more preferably to room temperature, preferably with further stirring during the cooling.

In the 2nd process step (ii), the reaction mixture is filtered and washed. This process step serves, inter alia, for the removal of salts that would be disruptive in the later use of the modified precipitated silica.

Washing can be accomplished using water, polar organic solvents or mixtures thereof; preference is given to washing with water, more preferably with demineralized, deionized (DM) water, which features a conductivity of <5 µS/cm, preferably of <3 µS/cm and more preferably of <0.1 µS/cm.

The washing can be effected in various ways. For example, the solids that have been separated by filtration are washed with fresh water until a sufficiently low (preferably constant) conductivity value of the washing water of <500 µS/cm, preferably <100 µS/cm, more preferably <10 µS/cm, is attained. The water may flow through continuously or in portions. A particularly efficient form of washing is the redispersion of the filtercake in clean water, followed by a further filtration.

The conductivity of water can be measured with a commercially available conductivity meter. One example of a conductivity meter that can be used is mentioned in the analysis methods.

One possible option is an aftertreatment with reagents that are known in the prior art and are typically used for modification.

Optionally, the reaction mixture is dried in a further process step (iii). The drying temperature is preferably more than 100° C. The drying operation has ended when the powder attains constant weight, meaning that the weight of powder does not change any further even in the course of further drying.

In a preferred procedure, the dried material may be ground after the purification. It is possible here to use equipment such as pin mills, sifter mills, hammer mills, counterflow mills, impact mills or devices for grinding and sifting.

The individual process steps can be conducted as a batchwise or continuous operation. For technical reasons, preference is given to a batchwise reaction regime. This procedure has the advantage that the plants are very simple and are not very prone to faults. It is possible to use standard stirrer systems. From the nucleation of the particles up to the finished product, there is a very well-defined narrow distribution of the "growth time", an important prerequisite for the production of homogeneous products.

For the batchwise operation, water is initially charged and heated up. Subsequently, the reactants, including acid, $[SiO_{4/2}]$ starting materials and optionally further substances, are metered in. In parallel or at a different time, the modifying agent is metered in. On completion of process step i), the entire mixture is withdrawn, filtered and washed (ii), optionally dried (iii) and/or ground.

In an alternatively preferred embodiment, the process steps are effected in a continuous process.

The continuous process comprises:

(a) the continuous feeding of the reactants, for example alkali metal silicate and acid, into a reaction zone through which liquid medium flows;

(b) the continuous feeding of organosiliconate in parallel with the reactants from (a) or at a different place with respect to the plant (in order to achieve addition at a different time with respect to the reaction mixture) into the reaction zone;

(c) the continuous removal of the product formed;

(d) optionally continuous filtering and/or washing;

(e) optionally continuous drying.

The simplest form of a reactor for conducting continuous chemical processes is a tubular reactor or tank reactor. WO 2011/106289 describes, for example, continuous silica production in a loop reactor that can also be used in this process.

A Taylor-Couette reactor is especially preferred, as described, for example, in DE 101 51 777. This generally consists of two coaxial concentric cylinders, where the outer hollow cylinder is at rest and the inner solid cylinder rotates. The reaction space used is the volume which is formed by the gap between the cylinders. As described in detail in DE 101 51 777, in the steady state, i.e. the state of the reactor after startup (with complete filling of the reactor with the reactants), the Taylor number is 50-50,000, preferably 500-20,000, more preferably 3000-10,000, and the Reynolds number (axial) is 0.0724 to 7.24, preferably 0.1348-2.69, more preferably 0.4042-1.35. The average residence time in the Taylor reactor may be between 5 and 500 minutes. Preferably, the reactor is operated in a vertical position with flow through it from the bottom upward or from the top downward.

The advantage of the process of the invention in which production and modification of the precipitated silica are effected in one pot is that the process is particularly inexpensive, rapid and simple to manage, and works in a resource-conserving manner. A particular advantage of the process is that it is possible to produce compositions that have a high chemical purity. In spite of the modification of the silica, it is easily possible to remove nonvolatile water-soluble impurities such as sodium, potassium and sulfur in process step (ii). It is especially advantageous here that, even under customary washing conditions, i.e. with small amounts of the washing medium or in a few washing steps, good removal of ionic impurities can be achieved, manifested, for example, in a constant low conductivity of the washing medium.

The invention further provides a composition characterized in that (a) it contains at least 95% by weight of precipitated silica, (b) the carbon content is at least 0.5% by weight, (c) the sodium and potassium contents together are not more than 5000 ppm and (d) the sulfur content is not more than 2500 ppm.

Preferably, the composition is producible by the process of the invention described above.

The composition contains at least 95% by weight, preferably at least 99% by weight and more preferably at least 99.5% by weight of precipitated silica.

The determination of the elemental constituents of the composition of the invention by means of elemental analysis can confirm the presence of the elements (see below for exact composition, for example, of the groups introduced by modification).

It is a feature of the composition of the invention that its carbon content is at least 0.5% by weight, preferably at least 1% by weight and more preferably at least 3% by weight. The carbon content of the composition of the invention is preferably not more than 15% by weight, more preferably not more than 10% by weight and most preferably not more than 5% by weight. The carbon content is based essentially on the modification of the precipitated silica with organic radicals.

The carbon content of the composition can be determined by means of elemental analysis, i.e. in a combustion analysis in a corresponding analyzer.

It is a feature of the composition of the invention that its sodium and potassium contents together are not more than 5000 ppm, preferably not more than 2500 ppm and more preferably not more than 1000 ppm.

In a preferred embodiment, the sodium content is not more than 5000 ppm, more preferably not more than 2500 ppm and most preferably not more than 1000 ppm.

In an alternatively preferred embodiment, the potassium content is not more than 5000 ppm, more preferably not more than 2500 ppm and most preferably not more than 1000 ppm.

It is a feature of the composition of the invention that its sulfur content is not more than 2500 ppm, preferably not more than 500 ppm, more preferably not more than 250 ppm and most preferably not more than 25 ppm.

The contents of the elements sodium, potassium and sulfur can be determined qualitatively and quantitatively by means of inductively coupled plasma optical emission spectrometry (ICP-OES). The method utilizes the property of the elements of being able to absorb energy from an inductively coupled plasma (usually argon). With release of characteristic radiation, the atoms fall from the excited state back to the ground state. This multielement method has a very low detection limit.

The composition of the invention contains essentially organically modified precipitated silica. By contrast with the compositions available in the prior art, it features a high chemical purity.

As a result, it has the advantage, for example, that distinctly fewer ionic impurities based on Na, K and S are introduced into a filler. As a result, silicone compounds of this kind feature significantly better insulation properties. There is also a positive effect on the visual appearance of silicone rubbers or the charging characteristics in applications in electrophotographic toners as a result of a smaller proportion of ionic impurities in the composition.

The composition of the invention therefore also constitutes an inexpensive alternative in sensitive applications in which fumed silicas that are usually of high purity but much more costly are used.

The composition of the invention is characterized in that the precipitated silica is preferably composed of $[SiO_{4/2}]$ units and $[(CH_3)SiO_{3/2}]$ units.

As already addressed above, the presence of the elements carbon, oxygen and silicon can be detected and quantified by means of elemental analysis. By means of elemental analysis or CHN analysis, in a corresponding analyzer, it is possible to determine the percentages by weight of the chemical elements and use this to calculate the empirical formula.

By means of nuclear resonance spectroscopy, it is possible to verify the presence of various [$R_xSiO_{(4-x)/2}$] units in the solid state, and to estimate the quantitative ratios. In this context, it is possible by means of $^{13}C$ NMR spectroscopy to identify the substituent R and, by means of $^{29}Si$ NMR spectroscopy, on the basis of the different shift ranges, to determine the number of substituents x in the [$R_xSiO_{(4-x)/2}$] units with x=0-4.

The composition of the invention is characterized in that the specific BET surface area of the precipitated silica is preferably 50 $m^2/g$ to 400 $m^2/g$, more preferably 100 $m^2/g$ to 300 $m^2/g$ and most preferably 150 $m^2/g$ to 250 $m^2/g$.

Since the composition of the invention contains at least 95% by weight, preferably with at least 99% by weight or 99.5% by weight, i.e. an even higher proportion of precipitated silica, the specific surface area of a sample of this composition can be measured directly and corresponds to the BET surface area of the precipitated silica present.

The specific surface area can be determined by the BET method according to DIN 9277/66131 and 9277/66132.

A very sensitive method of quantifying soluble impurities is the determination of the conductivity of a sample. For this purpose, the conductivity of a 4% dispersion in water is frequently employed. Since modified silicas are poorly wetted by water, if at all, the conductivity of the sample is determined in a methanol/water mixture. For this purpose, a small amount of sample (composition 5 g) is mixed with 10 g of methanol and only then diluted with 85 g of demineralized water. To achieve a homogeneous mixture, the batch is alternately mixed well and left to stand for a prolonged period. Prior to the measurement of conductivity with a conductivity measurement cell, the batch is shaken up once again. The conductivity can be measured with any desired conductivity meter. It is determined for a reference temperature of 20° C.

The composition of the invention is characterized in that the conductivity of the methanol/water dispersion thereof is preferably not more than 500 S/cm, more preferably not more than 100 S/cm and most preferably not more than 25 S/cm.

Preferably in accordance with the invention, highly hydrophobic silicas that are not soluble in the methanol/water mixture specified are not included.

The invention further provides for use of the composition as a reinforcing filler in crosslinkable silicone rubber compounds, as an antiblocking agent, in toners or developers.

The composition of the invention can be used as an antiblocking agent for water-redispersible polymer powders based on protective colloid-stabilized polymers of ethylenically unsaturated monomers.

The composition of the invention can be used as a reinforcing filler in crosslinkable silicone rubber compounds. Suitable crosslinkable silicone rubber compounds have long been known in the prior art. The crosslinking mechanism is of no importance here. All kinds of silicone rubber compounds are suitable, such as addition-crosslinking, peroxidically crosslinking, condensation-crosslinking, radiation-crosslinking and radiation-induced-crosslinking silicone rubber compounds. Particular preference is given to using the composition of the invention in an HTV formulation.

The invention further relates to the use of the composition of the invention in developers or toners, for example in magnetic 1-component and 2-component toners, but also in non-magnetic toners. These toners may consist of resins, such as polyester resins, styrene resins and acrylic resins, or mixtures thereof, and may preferably be ground to give particle distributions of 1-100 μm, or may be those resins that are produced in polymerization processes in dispersions or emulsions or solutions or in bulk to give particle distributions of preferably 1-100 μm. Toners or developers of this kind may be used preferably in any non-impact printing methods, such as electrophotographic printing methods. In addition, they are also usable in direct image transfer methods.

The invention is described in detail hereinafter with reference to working examples, without being limited thereto.

Analysis Methods:

Determination of BET Surface Area

The specific surface area was determined by the BET method according to DIN 9277/66131 and 9277/66132 using a Beckmann-Coulter SA™ 3100 analyzer.

Determination of Carbon Content (% C)

The elemental analysis for carbon was effected according to DIN ISO 10694 using a CS-530 elemental analyzer from Eltra GmbH (D-41469 Neuss).

Determination of the Conductivity of Water

Conductivity was determined with an SG3 Seven Go™ conductivity meter from Mettler-Toledo AG, 8603 Schwarzenbach, Switzerland, equipped with an InLab®738 sensor.

Determination of the Conductivity of a 5% Dispersion in a Methanol/Water Mixture Exactly 5.00 g of sample were weighed into a 250 mL screwtop PE container, mixed with 10.0 g of methanol and diluted with 85.0 g of demineralized water. The closed vessel was shaken well in order to obtain a homogeneous mixture and subsequently left to stand for one hour.

After a wait time of 60 minutes, the sample was shaken up again and then the conductivity was determined. The determination was accomplished using a SevenGo SG3 measuring instrument from Mettler-Toledo AG, equipped with an InLab®738 sensor. The measurement was effected at 27° C. and was converted to a reference temperature of 20° C. by temperature compensation in the measuring instrument.

Determination of Sodium, Potassium and Sulfur Content

The samples (about 5 g) were weighed out accurately and suspended with 50-100 mL of demineralized water, and 30 mL of a 40% HF solution (superpure) were added. The mixture was concentrated to dryness at 150° C. on a hotplate, and the residue was taken up in 1 mL of 65% nitric acid (superpure) and made up to exactly 5 mL with demineralized water. Elemental determination was effected by means of ICP-OES (Inductively-Coupled Plasma Optical Emission Spectrometry) using a Perkin-Elmer Optima 7300 V ICP-OES spectrometer. The instrument had been calibrated beforehand with four calibration solutions each time.

The element content in ppm (mg/kg) was obtained via:

Element content=($MW$*1000)/($EW$*200) with
$MW$=measured value in mg/L and $EW$=starting
weight in g.

EXAMPLES

Sulfuric acid, HF solution and nitric acid were sourced in p.a. quality, or in superpure quality, from VWR International. Hydrochloric acid was sourced in p.a. quality from Acros Organics. The demineralized (deionized) water used (DM water) had a conductivity of <0.1 μS/cm. Unless mentioned otherwise, the process steps up to the filtration and washing step were conducted while stirring.

Example 1

In a 2 L glass flask with flange lid, 900 g of deionized, demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 60 min. By appropriate metered addition of 98% sulfuric acid, within this period, the pH was kept at 9. Thereafter, within 30 min, in an analogous manner, 19.5 g of an aqueous potassium methylsiliconate solution (obtainable from Wacker Chemie AG as SILRES® BS16) were added. Within this period and within the subsequent further stirring phase of two hours, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100-Filter (both from Seitz) and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 2

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 60 min. By appropriate metered addition of 98% sulfuric acid, within this period, the pH was kept at 9. Thereafter, within 30 min, in an analogous manner, 39 g of an aqueous potassium methylsiliconate solution (obtainable from Wacker Chemie AG as SILRES® BS16) were added. Within this period and within the subsequent further stirring phase of two hours, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 3

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 61 min. By appropriate metered addition of 98% sulfuric acid, within this period, the pH was kept at 9. Thereafter, within 30 min, in an analogous manner, 78 g of an aqueous potassium methylsiliconate solution (obtainable from Wacker Chemie AG as SILRES® BS16) were added. Within this period and within the subsequent further stirring phase of 75 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 4

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 60 min. By appropriate metered addition of 98% sulfuric acid, within this period, the pH was kept at 9. Thereafter, within 95 min, in an analogous manner, 245 g of an aqueous potassium methylsiliconate solution (obtainable from Wacker Chemie AG as SILRES® BS16) were added. Within this period and within the subsequent further stirring phase of 90 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 5

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 180 g of waterglass (obtainable from Wollner GmbH as 38/40 sodium silicate solution) were subsequently metered in at a constant metering rate within 60 min. By appropriate metered addition of 98% sulfuric acid, within this period, the pH was kept at 9. Thereafter, within 30 min, in an analogous manner, 13.5 g of an aqueous potassium methylsiliconate solution (obtainable from Wacker Chemie AG as SILRES® BS16) were added. Within this period and within the subsequent further stirring phase of two hours, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 6

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 130 g of waterglass (obtainable from Wollner GmbH as 38/40 sodium silicate solution) were added at a constant metering rate within 30 min. By appropriate metered addition of 98% sulfuric acid, within this period, the pH was kept at 9. Thereafter, within 15 min, in an analogous manner, 39 g of an aqueous potassium methylsiliconate solution (obtainable from Wacker Chemie AG as SILRES® BS16) were added. Within this period and within the subsequent further stirring phase of 105 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 7

In a 2 L glass flask with flange lid, 900 g of demineralized water were heated to 80° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 60 min. By appropriate metered addition of 98% sulfuric acid, within this period, the pH was kept at 9. Thereafter, within 30 min, in an analogous manner, 78 g of an aqueous potassium methylsiliconate solution (obtainable from Wacker Chemie AG as SILRES® BS16) were added. Within this period and within the subsequent further stirring phase of 75 minutes, the temperature of the reaction mixture was still set at 80° C. and the pH was kept constant at 9 by addition of 98% sulfuric acid. By addition of 98% sulfuric acid while stirring the reaction mixture that was still being kept at a controlled temperature of 80° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 8

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 61 min. By appropriate metered addition of 98% sulfuric acid, within this period, the pH was kept at 8. Thereafter, within 30 min, in an analogous manner, 78 g of an aqueous potassium methylsiliconate solution (obtainable from Wacker Chemie AG as SILRES® BS16) were added. Within this period and within the subsequent further stirring phase of 60 minutes, the temperature of the reaction mixture was still set at 90° C. and the pH was kept constant at 8 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 9

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wöllner GmbH as 38/40 sodium silicate solution) were subsequently metered in at a constant metering rate within 40 min. By appropriate metered addition of 98% sulfuric acid, within this period, the pH was kept at 9. Thereafter, within 20 min, in an analogous manner, 78 g of an aqueous potassium methylsiliconate solution (obtainable from Wacker Chemie AG as SILRES® BS16) were added. Within this period and within the subsequent further stirring phase of 90 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 10

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 61 min. By appropriate metered addition of 98% sulfuric acid, within this period, the pH was kept at 9. Thereafter, the mixture was heated to reflux and, within 30 min, in an analogous manner, 39 g of an aqueous potassium methylsiliconate solution (obtainable from Wacker Chemie AG as SILRES® BS16) were added. Within this period and within the subsequent further stirring phase of 60 minutes, the temperature of the reaction mixture was still set at 90° C. and the pH was kept constant at 9 by addition of 98% sulfuric acid and still stirred under reflux. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 11

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) and 78 g of an aqueous potassium methylsiliconate solution (obtainable from Wacker Chemie AG as SILRES® BS16) were subsequently metered in simultaneously at a constant metering rate within 61 min. By appropriate metered addition of 98% sulfuric acid, within this period, the pH was kept at 9. Within the subsequent further stirring phase of 90 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 12

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) and 10 g of an aqueous potassium methylsiliconate solution (obtainable from Wacker Chemie AG as SILRES® BS16) were subsequently metered in simultaneously at a constant metering rate within 61 min. By appropriate metered addition of 98% sulfuric acid, within this period, the pH was kept at 9. Thereafter, within 30 min, in an analogous manner, 68 g of an aqueous potassium methylsiliconate solution (obtainable from Wacker Chemie AG as SILRES® BS16) were added. Within this period and within the subsequent further stirring phase of 60 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 13

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 60 g of waterglass (obtainable from Wollner GmbH as 38/40 sodium silicate solution) were subsequently metered in at a constant metering rate within 12 min. By appropriate metered addition of 98% sulfuric acid, within this period, the pH was kept at 9. Subsequently, with continued stirring, 201 g of waterglass (obtainable from Wollner GmbH as 38/40 sodium silicate solution) and 53 g of an aqueous potassium methylsiliconate solution (obtainable from Wacker Chemie AG as SILRES® BS16) were simultaneously metered in at a constant metering rate within 42 min, in the course of which the reaction mixture was still kept at a controlled temperature of 90° C. By appropriate metered addition of 98% sulfuric acid, within this period too, the pH was kept at 9. Thereafter, within 7 min, in an analogous manner, 9 g of an aqueous potassium methylsiliconate solution (obtainable from Wacker Chemie AG as SILRES® BS16) were added. Within this period and within the subsequent further stirring phase of 60 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 120° C. After cooling to room temperature, the solids were analyzed as described in the analysis methods. The results are listed in tab. 1.

Example 14

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 60 g of waterglass (obtainable from Wollner GmbH as 38/40 sodium silicate solution) were subsequently metered in at a constant metering rate within 13 min. By appropriate metered addition of 98% sulfuric acid, within this period, the pH was kept at 9. Subsequently, with further stirring, over a period of 90 min, the metered addition of waterglass was slowed continuously, such that, at the end, a total of 200 g of waterglass had been metered in (obtainable from Wollner GmbH as 38/40 sodium silicate solution). The metering rate at the start of the 90 min was 2.2 g/min and at the end 0.0 g/min. In parallel, within the same period, 53 g of an aqueous potassium methylsiliconate solution (obtainable from Wacker Chemie AG as SILRES® BS16) were metered in at an increasing rate. In other words, the metering rate at the start of the 90 min was 0.0 g/min and at the end 1.2 g/min. Within this period, the reaction mixture was still kept at a controlled temperature of 90° C. By appropriate metered addition of 98% sulfuric acid, within this period too, the pH was kept at 9. Thereafter, within 7 min, in an analogous manner, 9 g of an aqueous potassium methylsiliconate solution (obtainable from Wacker Chemie AG as SILRES® BS16) were added. Within this period and within the subsequent further stirring phase of 60 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 120° C. After cooling to room temperature, the solids were analyzed as described in the analysis methods. The results are listed in tab. 1.

Example 15

In a 2 L glass flask with flange lid, 900 g of demineralized water were heated to 90° C. in an oil bath. While stirring vigorously (900 min$^{-1}$) with a PTFE Bola anchor stirrer shaft from Bohlender GmbH (model: C 384-08), at this temperature, 261 g of waterglass (obtainable from Wollner GmbH as 38/40 sodium silicate solution) were subsequently metered in at a constant metering rate within 61 min. By appropriate metered addition of 98% sulfuric acid, within this period, the pH was kept at 9. Thereafter, within 32 min, in an analogous manner, 280 g of an aqueous sodium methylsiliconate solution (obtainable from Dow Corning Inc. as XIAMETER® OFS-0772) were added. Within this period and within the subsequent further stirring phase of 165 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until a constant conductivity value of the washing water was attained. The solids obtained were dried to constant weight in a drying cabinet at 130° C. After cooling to room temperature, the solids were analyzed as described in the analysis methods. The results are listed in tab. 1.

Example 16

In a 40 L universal stirrer system (steel/enamel) equipped with a propeller paddle stirrer, 18 kg of demineralized water were heated to 90° C. While stirring (250 min$^{-1}$), at this temperature, 5.23 kg of waterglass (obtainable from Wollner GmbH as 38/40 sodium silicate solution) were metered in at a constant metering rate within 60 min. At the same time, in parallel, 1.01 kg of 98% sulfuric acid were metered in, which kept the pH substantially constant (pH=9.0-9.3). The mixture was stirred at 90° C. for a further 15 min and then, while stirring at 90° C., within 55 min, 1.56 kg of an aqueous potassium methylsiliconate solution (obtainable from Wacker Chemie AG as SILRES® BS16) and 0.59 kg of 98% sulfuric acid were metered in (pH=8.9-9.6). The mixture was stirred at 90° C. and pH=9 for a further 1 h and then acidified to pH=3.5 by addition of 98% sulfuric acid while stirring. Cooling to 50° C. was followed by filtering-off by means of a chamber filter press using K100 filter plates, washing to neutral pH and blowing dry with nitrogen. The filtercake was dried to constant weight on metal sheets in a drying cabinet at 150° C. and, after being cooled down to room temperature, ground using a ZPS50 sifter mill from Hosokawa-Alpine (mill: 20,000 min$^{-1}$; sifter: 16,000 min$^{-1}$). Subsequently, the solids were analyzed as described in the analysis methods. The results are listed in tab. 1.

Example 17

In a 40 L universal stirrer system (steel/enamel) equipped with a propeller paddle stirrer, 18 kg of demineralized water were heated to 75° C. While stirring (250 min$^{-1}$), at this temperature, 5.23 kg of waterglass (obtainable from Wollner GmbH as 38/40 sodium silicate solution) were metered in at a constant metering rate within 60 min. At the same time, in parallel, 1.01 kg of 98% sulfuric acid were metered in, which kept the pH substantially constant (pH=9.1-9.3). The mixture was stirred at 75° C. for a further 10 min and then, while stirring, within 50 min, 1.52 kg of an aqueous potassium methylsiliconate solution (obtainable from Wacker Chemie AG as SILRES® BS16) and 0.59 kg of 98% sulfuric acid were metered in (pH=9.1-9.5). The mixture was stirred at 75° C. and pH=9 for a further 1 h and then acidified to pH=3.2 by addition of 98% sulfuric acid while stirring to the reaction mixture that was still being kept at a controlled temperature of 75° C. Cooling to 50° C. was followed by filtering-off by means of a chamber filter press using K100 filter plates, washing to neutral pH and blowing dry with nitrogen. The filtercake was dried to constant weight on metal sheets in a drying cabinet at 150° C. and, after being cooled down to room temperature, ground using a ZPS50 sifter mill from Hosokawa-Alpine (mill: 20,000 min$^{-1}$; sifter: 16,000 min$^{-1}$). Subsequently, the solids were analyzed as described in the analysis methods. The results are listed in tab. 1.

Example 18

In a 40 L universal stirrer system (steel/enamel) equipped with a propeller paddle stirrer, 18 kg of demineralized water were heated to 90° C. While stirring (250 min$^{-1}$), at this temperature, 5.23 kg of waterglass (obtainable from Wollner GmbH as 38/40 sodium silicate solution) were metered in at a constant metering rate within 120 min. At the same time, in parallel, 0.99 kg of 98% sulfuric acid was metered in, which kept the pH substantially constant (pH=9.0-9.2). The mixture was stirred at 90° C. for a further 10 min and then, while stirring, within 60 min, 1.52 kg of an aqueous potassium methylsiliconate solution (obtainable from Wacker Chemie AG as SILRES® BS16) and 0.59 kg of 98% sulfuric acid were metered in (pH=9.0-9.5), in the course of which the reaction mixture was still kept at a controlled temperature of 90° C. The mixture was stirred at 90° C. and pH=9 for a further 1 h and then acidified to pH=3.0 by addition of 98% sulfuric acid at 90° C. while stirring. Cooling to 50° C. was followed by filtering-off by means of a chamber filter press using K100 filter plates, washing to neutral pH and blowing dry with nitrogen. The filtercake was dried to constant weight on metal sheets in a drying cabinet at 150° C. and, after being cooled down to room temperature, ground using a ZPS50 sifter mill from Hosokawa-Alpine (mill: 20,000 min$^{-1}$; sifter: 16,000 min$^{-1}$). Subsequently, the solids were analyzed as described in the analysis methods. The results are listed in tab. 1.

Example 19

In a 6 L jacketed reactor, 4.32 kg of demineralized water were heated to 90° C. The reactor was equipped with a bypass conduit, and a portion of the reaction mixture was guided continuously through an Ultraturrax T25 dispersing unit (20 000 min$^{-1}$) from IKA®-Werke GmbH & CO. KG. While stirring with a turbine stirrer (400 min$^{-1}$), at 90° C., 1.25 kg of waterglass (obtainable from Wöllner GmbH as 38/40 sodium silicate solution) were subsequently metered in at a constant metering rate within 61 min. By appropriate metered addition of 62% sulfuric acid, within this period, the pH was kept at 9. Thereafter, within 41 min, in an analogous manner, 0.37 kg of an aqueous potassium methylsiliconate solution (obtainable from Wacker Chemie AG as SILRES® BS16) were added. Within this period and within the subsequent further stirring phase of 60 minutes, the temperature of the reaction mixture was still set at 90° C. and the pH was kept constant at 9 by addition of 98% sulfuric acid. By addition of 98% sulfuric acid while stirring the reaction mixture that was still being kept at a controlled temperature of 90° C., the pH was lowered to 3.5. After the reaction mixture had been cooled down to room temperature while stirring, the solids were removed in a pressure suction filter using a K100 filter and washed with demineralized water until the conductivity value of the washing water had been lowered to 20 μS/cm. The solids obtained were dried to constant weight in a drying cabinet at 130° C. After cooling to room temperature, the solids were analyzed as described in the analysis methods. The results are listed in tab. 1.

TABLE 1

Analytical data of the compositions produced from the process as described in the examples

| Example | C content [%] | Specific surface area of the metal oxide [m$^2$/g] | Na content [ppm] | K content [ppm] | S content [ppm] | Conductivity [μS/cm] |
| --- | --- | --- | --- | --- | --- | --- |
| 1 | 1.2 | 154 | 1500 | 910 | <20 | 15 |
| 2 | 2.2 | 139 | n.d. | n.d. | n.d. | n.d. |
| 3 | 3.7 | 126 | 1100 | 1900 | <20 | 18 |
| 4 | 8.4 | 99 | 1400 | 3100 | <20 | 19 |
| 5 | 1.2 | 190 | n.d. | n.d. | n.d. | n.d. |
| 6 | 3.6 | 203 | n.d. | n.d. | n.d. | 10 |
| 7 | 3.8 | 140 | 1200 | 550 | <20 | 13 |
| 8 | 4 | 107 | 1400 | 2500 | <20 | 18 |
| 9 | 3.9 | 151 | 750 | 1400 | <20 | n.d. |
| 10 | 2.2 | 126 | n.d. | n.d. | n.d. | n.d. |
| 11 | 4.1 | 121 | 360 | 890 | <20 | 10 |
| 12 | 3.7 | 123 | n.d. | n.d. | n.d. | n.d. |
| 13 | 2.4 | 164 | n.d. | n.d. | n.d. | n.d. |
| 14 | 2.5 | 156 | n.d. | n.d. | n.d. | n.d. |
| 15 | 7.1 | 89 | 1200 | 4 | 23 | 14 |
| 16 | 3.7 | 107 | n.d. | n.d. | n.d. | n.d. |
| 17 | 3.9 | 173 | n.d. | n.d. | n.d. | n.d. |
| 18 | 3.9 | 92 | n.d. | n.d. | n.d. | n.d. |
| 19 | 4 | 114 | 790 | 1500 | 20 | 13 |
| V* | n.d. | n.d. | 5500 | 69 | 2500 | 680 | n.d., not determined

V*, comparison, determination for Sipernat D17 (hydrophobic precipitated silica, commercially available from Evonik)

The invention claimed is:

1. A process for modifying precipitated silica to produce a modified precipitated silica, comprising:
   i) modifying the precipitated silica in a reaction mixture comprising
      1) acid,
      2) at least one of precipitated silica and/or [SiO$_{4/2}$] starting material(s), and
      3) at least one organosiliconate as a modifying agent,
   wherein modifying is effected during or directly after production of the precipitated silica,
   ii) filtering and washing the reaction mixture, and
   iii) optionally, drying the reaction mixture,
   wherein the [SiO$_{4/2}$] starting materials comprise alkoxysilanes, alkali metal silicates, or mixtures thereof.

2. The process of claim 1, wherein the modifying agent is added at a constant dosage rate.

3. The process of claim 1, wherein the temperature is kept constant during process step i).

4. The process of claim 1, wherein the pH is kept constant during process step i).

5. The process of claim 1, wherein the modifying agent is added to the reaction mixture in parallel with the acid and the [SiO$_{4/2}$] starting materials.

6. The process of claim 1, wherein the modifying agent is added to the reaction mixture at a different time.

7. The process of claim 1, wherein the organosiliconate is a methylsiliconate.

8. The process of claim 1, wherein the process is effected in a batchwise operation.

9. The process of claim 1, wherein the process is a continuous operation.

* * * * *